United States Patent [19]

Margraf

[11] 4,157,900
[45] Jun. 12, 1979

[54] TUBE FILTERS

[76] Inventor: Adolf Margraf, Am Schleplingsbach 46, D-3060 Stadthagen Wendthagen, Fed. Rep. of Germany

[21] Appl. No.: 803,136

[22] Filed: Jun. 3, 1977

[30] Foreign Application Priority Data

Jun. 9, 1976 [DE] Fed. Rep. of Germany ....... 2625753
Sep. 16, 1976 [DE] Fed. Rep. of Germany ....... 2641629

[51] Int. Cl.² ............................................. B01D 46/04
[52] U.S. Cl. ........................................ 55/294; 55/379; 55/507
[58] Field of Search ................ 55/294, 361, 365, 376, 55/377, 378, 379, 505, 507, 509; 210/448, 452

[56] References Cited

U.S. PATENT DOCUMENTS

| | | | |
|---|---|---|---|
| 2,167,236 | 7/1939 | Gieseler | 55/361 |
| 2,906,371 | 9/1959 | Jones | 55/294 |
| 2,976,953 | 3/1961 | Haas et al. | 55/294 |
| 3,436,898 | 4/1969 | Kaess et al | 55/509 |
| 3,556,300 | 1/1971 | Lodo | 210/452 |
| 3,710,559 | 1/1973 | Harris et al. | 55/378 |

FOREIGN PATENT DOCUMENTS

2434354  1/1976  Fed. Rep. of Germany ............ 55/294

*Primary Examiner*—Frank W. Lutter
*Assistant Examiner*—David L. Lacey
*Attorney, Agent, or Firm*—Kinzer, Plyer, Dorn & McEachran

[57] ABSTRACT

This invention relates to a tube filter assembly of the kind comprising a housing divided by a perforated wall into a dirty gas chamber and a clean gas chamber, and containing filter tubes which are attached to said perforated wall in a sealed fashion and are arranged to be cleaned periodically by counter-current scavenging from the clean gas side, said filter tubes being arranged in said dirty gas chamber, covering the holes in said perforated wall at their open ends, and being provided with an internal spacer member. The invention consists in that said spacer member of each said filter tube has passing through it a rigid support bar which is detachably connectable to a fixed part of said housing by means of a part which projects freely through the closed end of said tube, and in that said spacer member consists of at least one coil spring supported by said support bar, and said coil spring is connected to said support bar at a distance from said perforated wall and its end nearer the clean gas side is connectable, under tensile stress, to a perforated clamping flange situated in the clean gas chamber, between which flange and said perforated wall the rim of the opening in said filter tubes is clampable.

8 Claims, 8 Drawing Figures

FIG.2
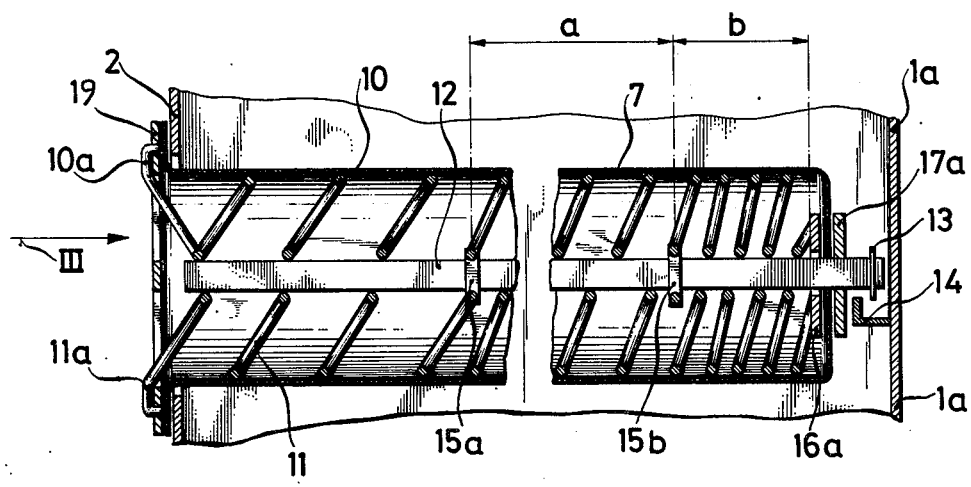
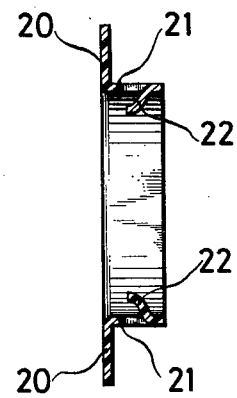
FIG.4
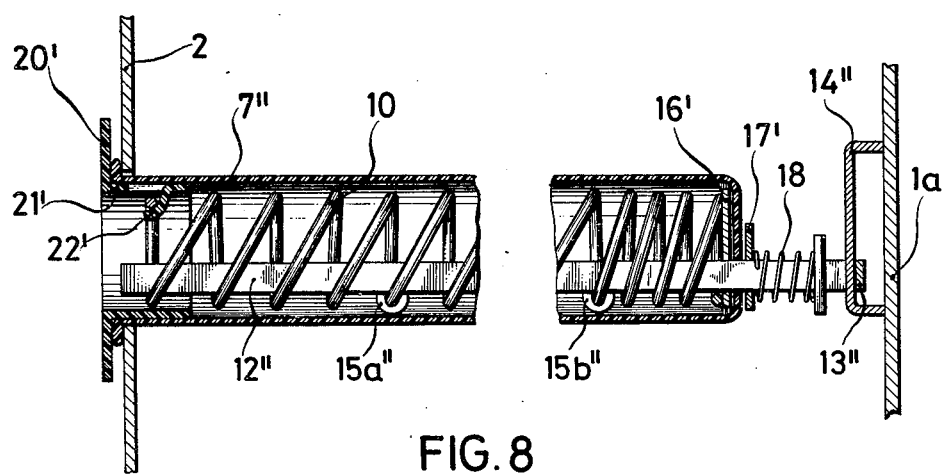
FIG.8

TUBE FILTERS

BACKGROUND OF THE INVENTION

The present invention relates to a tube filter assembly of the kind comprising a housing having a perforated wall defining a dirty gas chamber with a raw gas inlet and a clean gas chamber with a clean gas outlet, said dirty gas chamber and containing filter tubes which are attached to the perforated wall in a sealed fashion and are arranged to be periodically cleaned by counter-current scavenging from the clean gas side, said filter tubes being arranged in the dust removal space, covering the holes in the perforated wall at their open ends, and being provided with an internal spacer member.

In prior art filter tube assemblies it is known that the rim of the open end of the filter tube is to be attached in a special manner, e.g. by clamping the rim of the tube firmly against the perforated wall or partition by means of a screw-on clamping flange, thus making it necessary for a considerable amount of time and labor to be expended when fitting the filter tubes and exchanging defective ones, apart from the fact that in time the seal becomes less tight because the rim of the openings in the tubes, which is generally toroidal, contracts as a result of drying. In general, it is also necessary with such tube filters to compensate for stretching of the material of the tubes by means of tensioning devices.

It is an object of the invention to connect the circumferential rim at the open end of the filter tubes to the perforated wall dividing the filter housing in an air-tight fashion on the clean gas side without using screws and to make it possible for each filter element to be inserted into the dirty gas chamber from the clean gas side through a hole in the perforated wall while using a spacer member of the cheapest and simplest design.

It is another object of the invention to make the filter tubes and their spacer members in such a way that no creases are formed in the filter tubes but no active filter surface is lost and without the need for tensioning devices.

SUMMARY OF THE INVENTION

The invention consists in that, in a tube filter of the kind described, the spacer member for each filter tube has passing through it a rigid support bar which can be detachably connected to a fixed part of the housing by means of a part which projects freely through an opening of the otherwise closed end of the tube, and that the spacer member consists of at least one coil spring supported by the support bar; the coil spring is connected to the support bar at a distance from the perforated wall and is connectable by its end nearer the clean gas space, under tensile stress, to a perforated clamping flange situated on the clean gas side, between which and the perforated wall the rim of the opening in the filter tube can be clamped.

By this means it is possible for the support bar passing through the filter tube to be detachably connected to a fixed part of the housing in the vicinity of the closed end of the tube and then a part of said coil spring being connected to the support bar at a distance from the perforated wall and being directed toward the clean gas chamber to be placed under tensile stress and to be connected at the end of said coil spring to a clamping flange at the clean gas side of the perforated wall which clamping flange then clamps the rim of the opening of the filter tube, on the clean gas side, between the clamping flange and the perforated wall, so that in this way only a small amount of work has to be done to seal the tube against the perforated wall. This also has the advantage that the rim of the opening in the filter tube remains clamped and sealed by the clamping flange, which is under tensile stress, even if the thickness of the rim of the opening, which may be toroidal for example, decreases in the course of operation as a result of drying out. Finally, the arrangement according to the invention makes it easy for the filter elements to be fitted.

In an advantageous further embodiment of the invention, two coil springs lying on opposite sides of the support bar are securely connected to the support bar at two longitudinally spaced points to act as the spacer member for each filter tube, and the part of the coil springs between the two points of attachment is placed under tensile stress and the diameter of the coil springs is made considerably greater than the maximum cross-sectional dimension of the support bar.

In this way it becomes possible for the clamping flange to be pressed uniformly and symmetrically against the perforated wall in order to clamp the rim of each filter tube. This also ensures that when cleaning occurs, the filter tube can curve inwards between the two coil springs as soon as dust-laden gas is once more applied to the filter tubes after they have been cleaned by counter-current scavenging. Another result of this design is that a comparatively large filter surface can be accommodated in a given dust-removal space for the filter and that, should the material of the filter tubes stretch as a result of the alternating application of dust-laden gas and scavenging air, no creases are formed in the filter surfaces, without there being any need for tensioning devices. As a result of the fact that the coil springs are connected to the support bar at two spaced points and are under tensile stress between the points of attachment, the coil springs cannot bow out sideways and the spacer member and thus the tube maintains a constant outline.

BRIEF DESCRIPTION OF THE DRAWINGS

In order that the invention may be more clearly understood reference will now be made to the accompanying drawings, which show some embodiments thereof by way of example and in which:

FIG. 2 is a fragementary, enlarged-scale longitudinal section through a filter tube and spacer member, showing the attachment to the perforated wall of the filter housing, FIG. 4 is a cross-section through the clamping flange shown in FIG. 3, FIG. 8 is a longitudinal section through a third embodiment of a filter element in the filter housing.

DETAILED DESCRIPTION OF PREFERRED EMBODIMENTS

Figure 1:
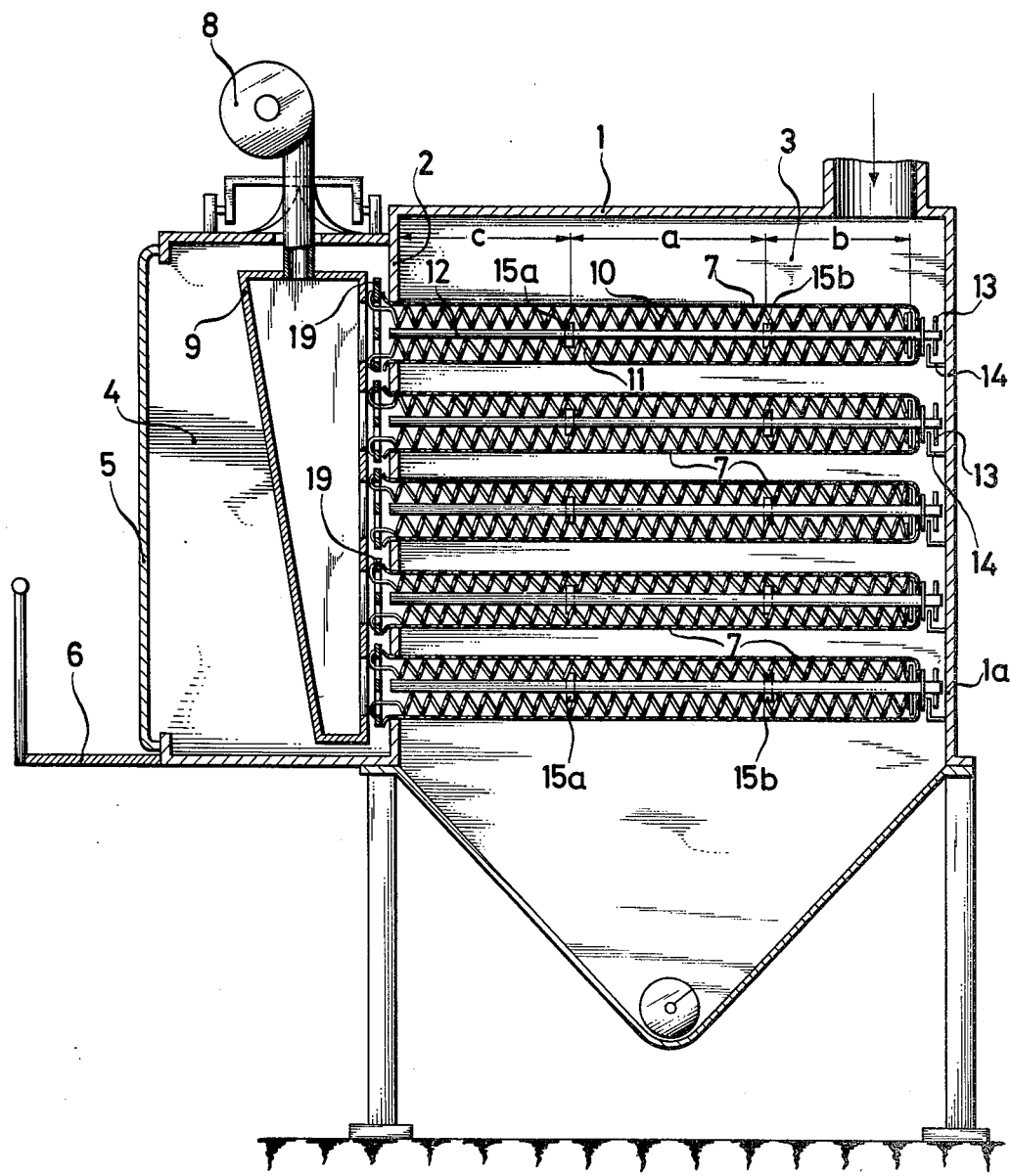
FIG. 1 is a schematic vertical section through a tube filter assembly in which the filter tubes occupy a horizontal or approximately horizontal position.

Referring now to the drawings, in the case of the schematically shown embodiment in FIG. 1, what is involved is a filter assembly for dust-laden gas whose housing 1 is divided, by a vertical partition 2 provided with openings of perforations arranged above one another in parallel rows, into a dirty gas chamber 3 having a row gas inlet and a dust-collecting trough and a dust conveyor at the bottom, and a clean gas chamber 4 situated next to the dirty gas chamber, from which the clean gas is removed through a clean gas outlet by an extractor. The clean gas chamber 4 is accessible from a gangway 6 at the side through doors 5.

The filter tubes 7, which are arranged above one another and in parallel rows next to one another with their open ends covering the opening in the perforated wall 2, lie in a horizontal position or in a position which is downwardly inclined relative to the horizontal and the clean gas side. In the dirty gas chamber 3 the infed dust-laden gas is applied to the filter tubes from the outside of the tubes to the inside of the tubes. By means of a cleaning blower 8 and a nozzle 9 which moves back and forth in the clean gas chamber in the longitudinal direction, the filter tubes are cleaned periodically from the clean gas side by counter-current scavenging. It is however also possible for them to be cleaned by compressed air, possibly combined with blower-fed air, and also for the cleaning to be performed by means of fixed nozzles connected to a source of compressed air.

In accordance with the invention, each filter tube 7 is provided with an internal spacer member. This spacer member may comprise one internal, longitudinally extending coil spring 10 (FIG. 8), but it is advantageous for it to comprise two parallel, longitudinally extending coil springs 10 and 11 (FIGS. 1, 2 and 3) which lie on opposite sides of a rigid longitudinally extending support bar 12 which also forms a stiffener to prevent the filter element from sagging. This support bar 12 projects through an opening at the bottom 16 of the tube 7 (which is otherwise closed) and is provided at this point with an attachment member which may be a transverse pin 13, an angled portion or a hook, and which engages behind a hook 14 arranged on the rear wall 1a of the housing or in a loop 14, by which means the support bar is held securely in position against longitudinal movement in the direction to the clean gas chamber 4.

The coil springs 10, 11 whose diameter is greater than the maximum cross-sectional dimension of the support bar 12, are securely connected to the support bar 12 at two points 15a and 15b spaced from the ends of the support bar 12, in such a way that for as long a length as possible a part a of the coil springs between the two attachment points 15a and 15b is under tensile stress, which prevents the coil springs 10, 11 from being able to bow outwards from the support bar 12. The ends of the coil springs are similarly unable to deflect outwards, as will become apparent from what is to follow.

Figure 3:
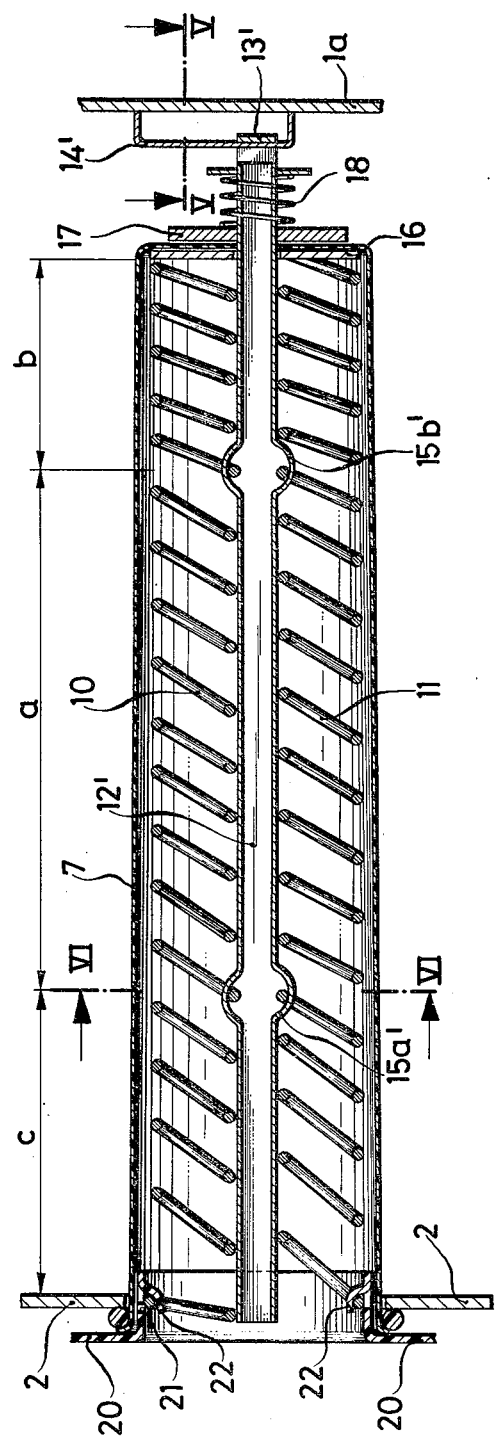
FIG. 3 is an enlarged-scale longitudinal section through a filter element which is modification of the element shown in FIG. 2.
Figure 5:
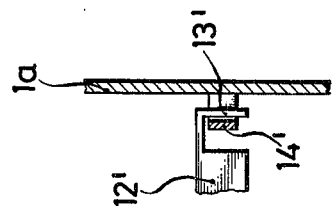
FIG. 5 is a partial section on line V—V of FIG. 3.
Figure 6:
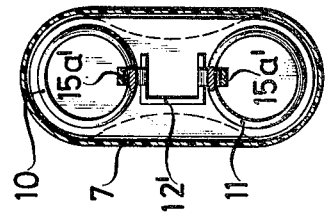
FIG. 6 is a cross-section on line VI—VI of FIG. 3.

The support bar 12 may be of any desired cross-sectional shape. However, to make it easy for the spacer member to be fitted, the shape shown in FIGS. 3 and 6 is that of a U. At points 15a and 15b, the side limbs of the U are provided with stamped portions which form lugs which are pressed outwards and which each fit round a coil at an end of the portion a of the springs 10 and 11 which is to be placed under tensile stress.

The individual filter elements are fitted from outside the filter housing 1 in the following manner.

The assembled spacer member consisting of the support bar 12 and the coil springs 10 and 11 attached to it, is provided with a washer 16a which is secured in place on the support bar 12 and which confines the ends of the portions b of the springs 10 and 11, which are also able to be placed under compression stress (FIG. 3). A filter tube is drawn over the spacer member with the support bar 12 projecting freely through the bottom of the tube. A washer 17 is then loosely mounted onto the end of the support bar and this washer is pressed by a compression spring 18 against the end of the tube 7 so that the closed or bottom end of the tube, which is provided with an opening for the support bar 12 to pass therethrough, is securely clamped and sealed between washers 16 and 17.

It is however also possible to adopt the procedure shown in FIG. 2, where the parts b of the springs 10 and 11 are placed under compression stress and the closed end of the tube is thus clamped and sealed between a displaceable washer 16a and a washer 17a secured to the supporting rod 12.

Having been assembled in this way, the filter element, consisting of the inner spacer member 12, 10, 11 and the tube 7, is now inserted through an opening in the perforated wall 2 and into the dirty gas chamber 3 from the accessible clean-gas chamber 4, the support bar 12 being grasped and hung by its attachment member 13 in the hook 14 (FIGS. 1 and 2) or in the loop 14" (FIGS. 3 and 8). When this has been carried out, the rim of the opening or the beaded rim of the tube 7 is situated in the clean gas chamber 4 against the perforated wall 2. Part C of the coil springs 10, 11 is now placed under tension manually and the ends of the springs are hooked into holes in a clamping flange, e.g. an annular or perforated plate 19 (FIGS. 1 and 2). Because of the tension in parts c of the springs, the plate 19 presses the rim of the opening in the tube 7 firmly and tightly against the perforated wall 2 and the seal so formed is maintained at all times by the tension of the springs.

To make it easy for parts c of the springs to be connected to a clamping flange, FIGS. 3 and 8 show a ferrule or sleeve 21 which fits into a hole in the perforated wall 2 and is provided with a collar 20, and which has inwardly deflected lugs 22 which are formed by stamping or the like or which may be integrally formed if the clamping flange consists of suitable plastics material. The last turns of the springs 10, 11, whose portions c are to be placed under tensile stress, can then be engaged in these hook-like lugs 22 once the flange 20, 21 has been inserted in the end of a filter element which has been passed through a hole in the perforated wall. The rim of the opening in the tube 7 is thus once again firmly clamped and sealed.

It will be appreciated that this is a particularly easy way of achieving a lasting seal between the tube and the clean gas chamber. In addition, the spacer member is particularly simple and all the filter elements are easy to fit. Removal of a filter tube is easy, e.g. to exchange a defective tube, since it is merely necessary to release the ends of the springs from the clamping flanges and then to lift the filter element out of the hook or loop connection at the rear wall 1a of the housing and to withdraw the filter element from the dust-removal space.

Figure 7:
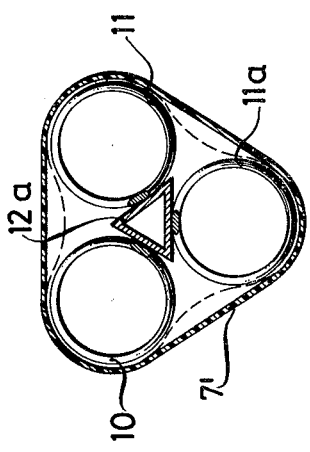
FIG. 7 shows a cross-sectional configuration which is modified in comparison with FIG. 6.

In accordance with the invention it is possible to connect only one coil spring (FIG. 8) to the support bar 12, in the manner explained above, but it is advantageous to use two coils springs 10, 11 or, when the support bar 12a (FIG. 7) is of a different, triangular cross-sectional shape, to connect one coil spring 10, 11, 11a to each side of the cross-section. Finally, it would also be possible to use a square-section member as the support bar together with four coil springs.

By using a plurality of coil springs, and advantageously two coil springs 10, 11, the advantage is achieved that there is negligeable stretching of the material of the filter tubes. Such stretching occurs because dust-laden gas is applied to the tubes from the outside to the inside of the tubes, but they are periodically cleaned by an opposing flow of scavenging air or compressed air from the inside to the outside of the tubes, so that when being cleaned the tubes swell out radially and when the dust-laden gas is applied they are forced back against the internal spacer member. Such stretching cannot be prevented. By using, advantageously, two coil springs whose diameter is considerably greater than the cross-section of the support bar, the stretched filter surfaces are able to curve inwards between the two springs when the dust-laden gas is applied (as shown in broken lines in FIGS. 6 and 7), so that creases are prevented from forming with no loss of active filter surface.

The design and fitting according to the invention of the filter elements is of course also applicable when the unit shown in FIG. 1 is rotated clockwise 90° whereby the clean gas chamber is situated above the dust-removal chamber, so that the filter elements then hang down from a perforated wall 2, in which case the free ends of the support bars are once again secured against movement in the direction of the clean gas chamber by hooks and loops or the like.

In accordance with the invention, it is also possible to use a known supporting framework as the spacer element in the tubes 7 rather than the coil springs 10, 11, this framework consisting of parallel rods extending in the longitudinal direction of the tube which are rigidly supported on the support bar 12. Over a length c of the tube 7 and inside the supporting framework, one spring or, depending upon the cross-section of the supporting framework, a plurality of springs, are connected at one end to the support bar and may be detachably connected at the other end, under tensile stress, to the clamping plate 19 or the clamping flange 20, 21. The bottom of the tube through which the support bar 12 passes may be sealed in the way described or by clamping and sealing a part of the bottom which surrounds the opening for the support bar to the said bar by means of a collar.

I claim:

1. In a tube filter assembly of the kind comprising a housing having a perforated wall presenting openings and defining a dirty gas chamber with a raw gas inlet and a clean gas chamber with a clean gas outlet, said dirty gas chamber containing filter tubes each having an open end connected to a related one of the wall openings in a sealed fashion with respect to said wall openings and arranged to be cleaned periodically by counter-current scavenging from the clean gas side, said filter tubes each having a closed end, the improvement comprising: each said filter tube has passing through it a rigid support bar which is detachably connected at one end to a fixed part of said housing by means comprising a part which projects through the closed end of said tube, and at least one coil spring supported by said support bar, said at least one coil spring being connected to said support bar at a distance from said perforated wall and having its end adjacent the clean gas chamber connected, under tensile stress, to a perforated clamping flange situated on the clean gas chamber, between which flange and said perforated wall the rim of the opening in the related filter tube is clampable.

2. A tube filter assembly according to claim 1, wherein said at least one coil spring comprises two coil springs supported by said support bar, each of the two coil springs lying on opposite sides of said support bar and securely connected to said support bar at two longitudinally spaced points spaced from the ends of said support bar so that an intermediate part of each coil spring between the two points of attachment is placed under tensile stress, and the diameter of each coil spring being greater than the maximum cross-sectional dimension of said support bar.

3. A tube filter assembly according to claim 1, wherein said support bar passes through the closed end of the related filter tube in a sealed manner and is provided with a transverse member engaged in a fixed loop on said housing which comprises said fixed part.

4. A tube filter assembly according to claim 1, wherein, said support bar adjacent said one end is securely connected to a fixed washer extending perpendicularly to said support bar, a displaceable washer on said support bar, and resilient means bearing against said fixed washer whereby said two washers clamp and seal the closed end of said filter tube between them.

5. A tube filter assembly according to claim 1, wherein said clamping flange consists of a plate containing at least one opening and said plate having means to engage the end of said spring under tension at the circumferential edge.

6. A tube filter assembly according to claim 1, wherein said clamping flange consists of a ferrule having a circumferential collar and hook-like projections on its interior, said projections being arranged to engage the last turns of said parts of the coil spring which are nearer the clean gas chamber and are placed under tensile stress.

7. A tube filter assembly according to claim 1, wherein said support bar is of square cross-section and each side of said cross-section has a coil spring connected thereto.

8. A tube filter assembly according to claim 1, wherein said bar is of triangular cross-section.

* * * * *